UNITED STATES PATENT OFFICE.

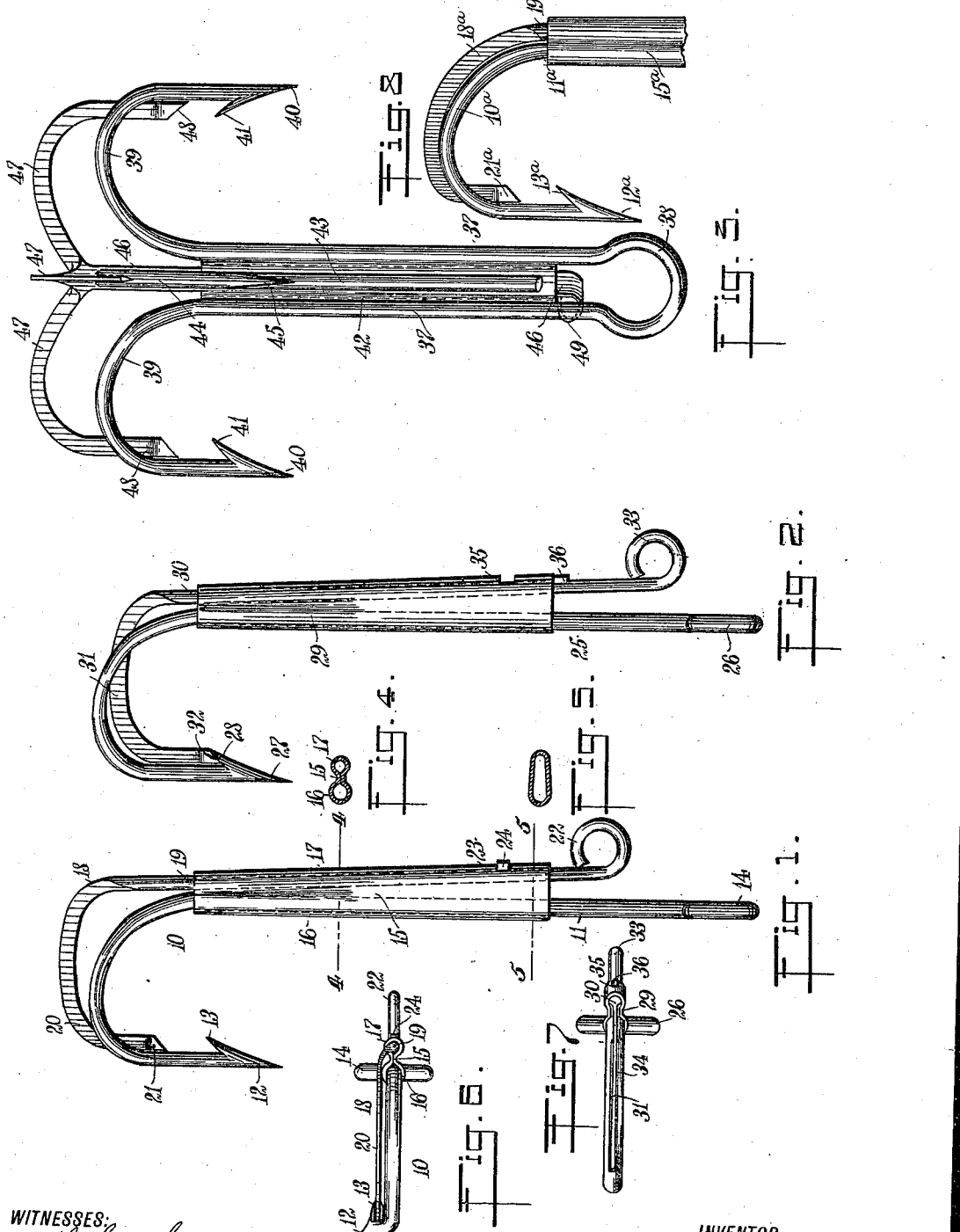

JOSEPH J. MUELLER, OF GOLD ROCK, ONTARIO, CANADA.

FISH-HOOK.

989,392.   Specification of Letters Patent.   Patented Apr. 11, 1911.

Application filed October 11, 1910. Serial No. 586,428.

*To all whom it may concern:*

Be it known that I, JOSEPH J. MUELLER, a citizen of the Republic of Switzerland, and a resident of Gold Rock, in the Province of Ontario, Dominion of Canada, have invented a new and Improved Fish-Hook, of which the following is a full, clear, and exact description.

This invention relates to hooks for fishing and like purposes, and has reference more particularly to the combination with a hook having a barb, of a guard movable into and out of juxtaposition with the barb of the hook to render the same inoperative.

The object of the invention is to provide a simple, strong and durable hook for fishing and like purposes, which has a barb so that when it is forced into the body the barb tends to prevent the withdrawal of the hook, and which is provided with a guard normally inoperative, and movable into a position so that it renders the barb inoperative, to permit the hook to be withdrawn, which renders easy and expeditious the removal of the fish hook from the mouth of the fish after the fish has been caught, which prevents injury to the hook and unnecessary suffering to the creature, and which can be applied to hooks of different types and sizes.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of an embodiment of my invention; Fig. 2 is a similar view of a modified form of the device; Fig. 3 is a side elevation of a further modified form of the device; Fig. 4 is a transverse section on the line 4—4 of Fig. 1; Fig. 5 is a similar view on the line 5—5 of Fig. 1; Fig. 6 is an end view of the form of the device shown in Fig. 1; Fig. 7 is a similar view of the form of the hook shown in Fig. 2; and Fig. 8 is a fragmentary side elevation of another modified form of the device.

Before proceeding to a more detailed explanation of my invention, it should be clearly understood that while the same is particularly useful as applied to fishhooks, it can also be adapted for use with hooks having barbs, and used for other purposes but intended to be forced into flesh or the like, and normally retained in place by the barbs. The ordinary fish-hook, when embedded in the mouth or another part of the fish, is removed with difficulty, owing to the barb, which of course, is designed for that very purpose, and entails needless suffering, and unnecessary labor and loss of time in its removal. In my invention, the guard, which is normally inoperative, so that it will in no way interfere with the catching of the fish, can be brought into juxtaposition with and partly under the barb, so that the hook can be easily withdrawn.

Certain of the details of construction, shown for example herewith, form no part of the invention, and can be varied in accordance with individual preference and special conditions, without departing from the underlying spirit of the invention.

Referring more particularly to the drawings, in the form of the device shown in Fig. 1, I employ a fish-hook 10 of the ordinary type, having a shank 11, a point 12, and adjacent thereto a barb 13. At the end of the shank is an eye 14 by means of which the hook is attached to a line or a leader. The point of the hook is preferably laterally disposed, as is shown in Fig. 6. A double sleeve 15, fashioned from sheet metal or any other suitable material, has a tubular part 16 rigidly secured by soldering or in any other suitable manner, on the shank 11, and a second tubular part 17, which is preferably at a slight angle with respect to the part 16. A guard 18 has a stem 19 movably located in the part 17 of the sleeve, and is provided with a flattened bend 20 conforming to a certain extent to the curved part of the hook. The end 21 of the bend is beveled to fit into the angle between the barb and the hook, and preferably is enlarged at the end. At the end, the stem 19 of the guard has an eye 22 forming a grip which permits its manipulation with ease.

The sleeve 15 near the wider end, at which the parts 16 and 17 are merged, has an opening 23 adapted to receive a stop projection 24 of the guard stem. When the stop is in the opening 23, the guard is inoperative with respect to the barb, being positioned as is shown in Fig. 1. When it is desired to release the hook, the stem of the guard is inwardly pressed to disengage the stop from the recess, and the stem is then moved in the direction of the length of the hook shank, toward the eye 14, to bring the end of the bend 20 into juxtaposition with the barb, which is thus rendered inoperative. The beveled form of the end 21 permits the guard to move easily in position adjacent to the barb. It will be understood that when the guard is in juxtaposition with the barb, the latter can offer no resistance to the withdrawal of the hook. In this form of the device the bend of the hook is offset, so that the end 21 of the bend can assume an operative position with the laterally disposed or offset barb as is shown in Fig. 6.

In Fig. 2 I have shown a modified form of the device, in which the hook has the usual shank 25, the eye 26, the point 27, and the barb 28. A sleeve 29 is mounted upon the shank 25 and has movable therein the stem 30 of the guard, which has the bend 31 and the beveled point 32. At the opposite end, the guard stem has an eye 33. The point of the hook is not offset and the bend thereof has a slot 34, through which the bend 31 of the guard moves, as is shown in Fig. 7. The sleeve has an opening 35 adapted to receive the stop projection 36 of the guard stem.

In Fig. 3 is disclosed a form of plural hook in which an elongated member 37 is bent upon itself to form two hook shanks having at the connection the eye 38 by means of which the hook can be attached to a line. The hooks have bends 39, points 40, and barbs 41. A body plate or member 42 is soldered or otherwise secured to the stems 37, and has, likewise, fastened thereto, the stem 43 of a further hook having a bend 44 and a point 45. The body 42 forms a sleeve in which is guided to move the guard stem 46, which has a plurality of bends 47, each corresponding to one of the hook bends and having the end 48 tapered to fit in juxtaposition with one of the barbs. The end of the stem 46 is rearwardly disposed or bent to form a grip 49, by means of which it can be manipulated.

In Fig. 8 I have shown another modified form of the device, in which the fish hook $10^a$ having the shank $11^a$ and the point $12^a$ provided with a barb $13^a$, has mounted upon the shank a double sleeve $15^a$, similar to the sleeve 15. The hook is slit, and has associated therewith the guard $18^a$ having a stem $19^a$ movable in the sleeve $15^a$. In the normal position of the parts in this form of the device, the guard lies adjacent to the hook, with the end $21^a$ of the guard spaced above the barb $13^a$ of the hook. When the end of the guard is moved into juxtaposition with the barb, the guard passes through the split in the hook.

Having thus described my invention, I claim as new, and desire to secure by Letters Patent:

1. The combination, with a hook having a barb, of a guard conforming substantially to the hook and movable into and out of juxtaposition with said barb to render the same inoperative, said guard being normally inoperative.

2. The combination, with a hook having a barb, of a movable hook-shaped guard conforming to the hook and normally inoperative, and adapted to be moved into juxtaposition with said barb to render the same inoperative, and means for holding said guard normally inoperative.

3. The combination, with a hook having a barb, of a bent guard slidable longitudinally of said hook, and having the end adapted to be positioned against said barb to render the same inoperative and means for holding said guard normally inoperative.

4. The combination, with a hook having a barb and a guide, of a normally inoperative guard slidable in said guide and having a hook-shaped part adapted to be positioned adjacent to said barb, and means for holding said guard in an inoperative position.

5. A fish-hook having a shank, a point, and a barb, in combination with a guide sleeve mounted upon said shank, and a guard conforming to said hook and having a stem movable in said sleeve and adapted to be arranged in juxtaposition with said barb to render the same inoperative and means for holding said guard normally inoperative.

6. A fish-hook having a shank, a point, and a barb, in combination with a guide sleeve mounted upon said shank, and a hook-shaped guard having a stem movable in said sleeve and adapted to be arranged in juxtaposition with said barb to render the same inoperative, said sleeve and said guard having a catch serving to hold said guard in an inoperative position.

7. The combination, with a hook having a barb, of a guard movable into and out of juxtaposition with said barb to render the same inoperative, said guard having a beveled point adapted to be arranged adjacent to said barb.

8. The combination, with a hook having a barb and a slot, of a guard movably associated with said hook and movable through said slot, said guard having a part adapted to be arranged in juxtaposition with said barb, to render the same inoperative.

In testimony whereof I have signed my name to this specification in the presence of two subscribing witnesses.

JOSEPH J. MUELLER.

Witnesses:
H. GUY WOODWARD,
CARL BÉYRODT.

Copies of this patent may be obtained for five cents each, by addressing the "Commissioner of Patents, Washington, D. C."